2,402,430

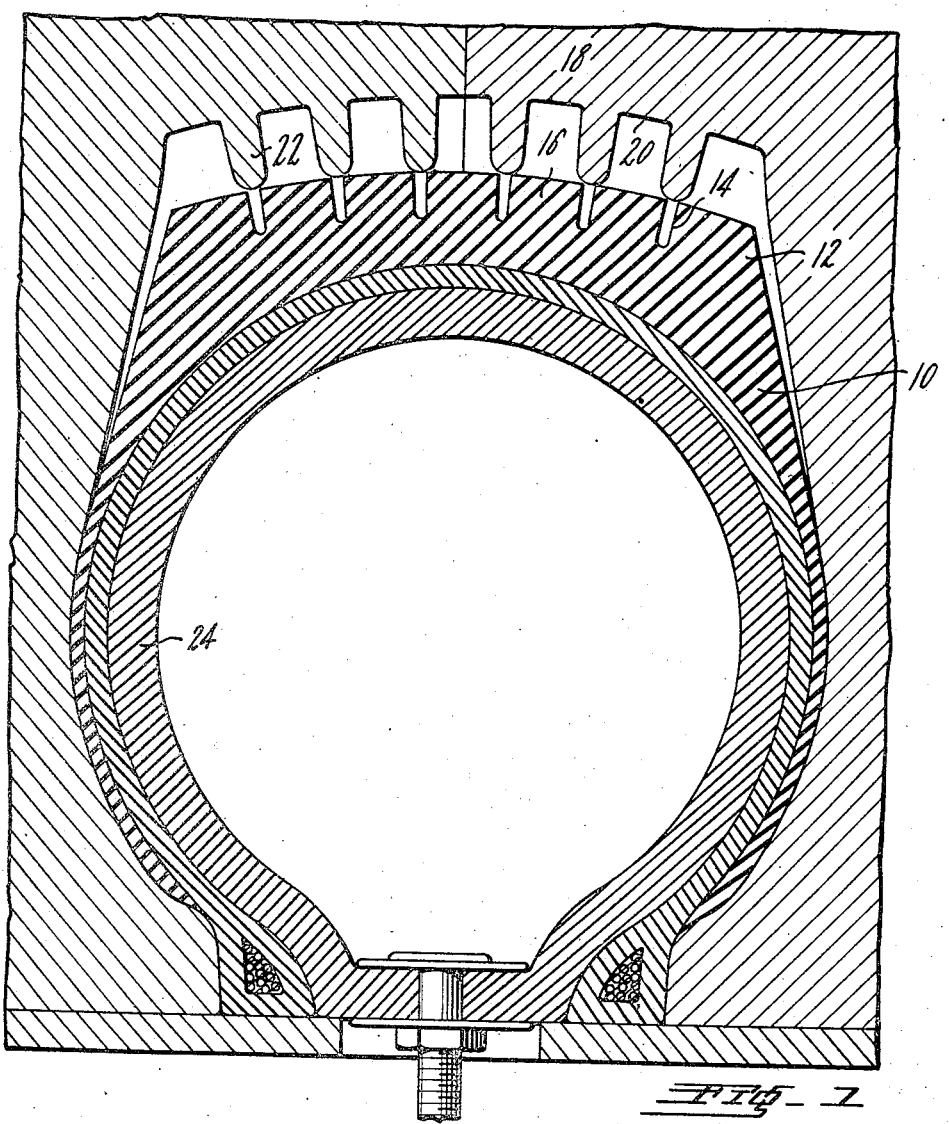
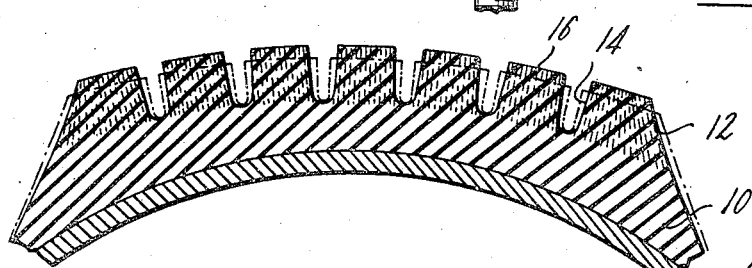
INVENTORS
MELVIN MOONEY
EUGENE M. GRABBE
BY GLENN G. HAVENS
ATTORNEY Patented June 18, 1946

UNITED STATES PATENT OFFICE 2,402,430

METHOD OF MAKING RUBBER ARTICLES

Melvin Mooney, Lake Hiawatha, and Eugene M. Grabbe, Nutley, N. J., and Glenn G. Havens, San Diego, Calif., assignors to United States Rubber Company, New York, N. Y., a corporation of New Jersey Original application June 16, 1943, Serial No. 490,984. Divided and this application February 17, 1944, Serial No. 522,762

2 Claims. (Cl. 18—53)

This invention relates to improvements in the wearing qualities of rubber articles, attained by increasing the resistance to abrasion of those surfaces of the rubber which are exposed to abrasion. It is especially applicable to the treads of rubber tires.

This application is a division of our co-pending application Serial No. 490,984, filed June 16, 1943.

We have discovered that when a body of rubber composition which has been vulcanized or is partially vulcanized stretched, and while held stretched is heated for a sufficient time and at a sufficient temperature, the rubber retains part of its original elongation when released. If such a rubber article is cut or formed with a surface which lies across (that is, the surface is perpendicular or nearly perpendicular to) the direction of stretch, such surface exhibits a distinct increase in resistance to abrasion, as compared to a corresponding surface of a similar article which has not been stretched and heated as described. The rubber which has been stretched is anisotropic, that is, the quality of increased resistance to abrasion which is exhibited by surfaces perpendicular to the direction of elongation, is not exhibited by surfaces parallel to the direction of elongation. Experiments demonstrate that in rubber which has been so treated there is a distinct fibrous structure or grain in the direction of original elongation of the rubber. X-ray diffraction tests show that this grain of fibers, to the extent to which it occurs, is due to an orientation or positioning of the individual molecules of the rubber composition, which as is known, are in the shape of very long and very thin filaments. That is, we believe that some of the filament-shaped molecules are changed from their previous random arrangement to positions in which they are aligned in the direction of elongation of the rubber. To the extent that such alignment occurs, the resulting aligned structure may be viewed as roughly analogous to the pile of a pile carpet. Some or a large number of the filament-like molecules have been arranged parallel to each other and are held in such parallel position, which is perpendicular or nearly perpendicular to the abrasion surface. This surface thus consists to a large degree of the ends of filament-like molecules, and the ends of the molecules appear to offer greater resistance to abrasion than a random arrangement of the molecules. Also, as the surface wears away, the aligned fibers continue to be presented endwise to new surfaces as they are progressively formed, thus maintaining the abrasion-resistance throughout the depth of the rubber.

We have discovered that these improved abrasion resistant qualities can be imparted by the present invention, not only to compositions of natural rubber, but also to other rubbers or rubber-like materials, such as reclaimed rubber; the synthetic material marketed under the trade name neoprene and said to be made by polymerizing chloro-2-butadiene-1,3; the co-polymer of butadiene and stryrene known as Buna S and various copolymers of major portions of isobutylene with minor portions of diene hydrocarbons and known generally by the name of butyl rubbers. We believe that improved abrasion resistance can also be imparted by the present invention to various copolymers of butadiene and acrylonitrile commonly called Buna N, examples being the materials marketed under the trade names Perbunan, Hycar, and Chemigum.

Accordingly, it is an object of the invention to provide rubber tires and other objects which must be exposed to abrasion, with improved abrasion-resistant surfaces and to provide a practical and economical method by which such improved abrasion-resistant rubber articles can be made in quantity production.

In the accompanying drawing:

Fig. 1 illustrates one manner of carrying out the process of our invention and is a transverse sectional view of a tire in an intermediate stage of manufacture showing diagrammatically one form of apparatus for treating a tire in accordance with the invention; and Fig. 2 is a partial section corresponding to Fig. 1 showing a transverse section or profile of a completed tire embodying the invention, upon which is superposed the profile of the tire at the stage shown in Fig. 1.

The invention is described for purposes of illustration as applied to rubber tires but it is to be understood that the invention is equally applicable to other rubber articles.

It has previously been proposed to make solid rubber tires having a grain normal to the surface of the tread, for the purpose of preventing the propagation of cuts in directions parallel to the surface, but these proposals have not been applicable to pneumatic tires, especially to pneumatic tires having non-skid treads. For example the patent to Willshaw, No. 1,539,618, disclosed a solid tire made by extruding a strip of rubber and cutting the strip lengthwise along a plane normal to a circular grain said to be set up by the extrusion.

By our invention non-skid pneumatic tires of conventional appearance can readily be made by conventional molding equipment.

In applying our invention to tires we use any conventional tire tread composition, for example a rubber composition consisting predominantly of 100 parts by weight of any of the above described rubbers or synthetic rubbers and, from 35 to 60 parts by weight of carbon black, and containing the appropriate vulcanizing agents, accelerators, activators and other compounding ingredients, as is well known in the art.

Referring to Fig. 1, 10 designates as a whole a conventional automobile tire having a tread 12 subdivided by circumferential grooves 14 to form any suitable number of circumferential anti-skid elements in the form of continuous ribs 16. The tire as thus described is placed in a conventional mold and vulcanized partially or completely. Preferably it is only partially vulcanized. Satisfactory results are obtained by a partial vulcanization which brings the T-50 of the tread to a value between 0° C. and —5° C. although T-50 values either above or below this range result in improvement in the finally cured tire. This partially vulcanized tire is then removed from the mold and placed in a mold such as shown by 18 in Fig. 1. In this mold there are a number of rib cavities 20, each corresponding to a rib 16 but narrower than the width of the rib 16 and deeper than the height of the rib. The cavities 20 are defined by mold ribs 22 which correspond to the grooves 14 and are beveled or rounded at their ends as shown. A conventional curing bag 24 is placed inside of the tire and the tire locked in the mold in the usual manner. The ribs 22 of the mold are lubricated in any suitable manner as with soap or a suitable lubricant containing potassium oleate. After the tire is locked in the mold, water under high pressure, for example 2,000 pounds per square inch, is forced into the curing bag until the tread is forced accurately into the mold. In being forced into the mold, each of the ribs 16 is compressed axially of the tire and is stretched radially of the tire so that finally each rib 16 conforms exactly to the corresponding groove 20. The pressure in the curing bag is maintained to hold the ribs in this radially elongated and axially compressed state and the mold is heated to effect the final vulcanization of the rubber to the usual T-50 value for the rubber compound used, the value for the best cure varying from —10° C. to —30° C., as is well known to rubber compounders, according to the percentage of sulfur and the accelerator employed in the compound. For example, when about 2.5% of sulfur, and a mercaptothiazole type accelerator are used, the optimum T-50 value for the final cure is between —12° C. and —15° C., and for most tread compounds it is between —10° C. and —20° C.

The tires may then be removed from the mold but it is preferable to cool the tire before removing from the mold so that the compression stresses are maintained while the tire is cooling.

Fig. 2 shows the relative shapes and dimensions of the ribs 16 in the partially cured and completely cured conditions. The solid lines show the form of the ribs after removal from the mold shown in Fig. 1, while the broken lines indicate the shape and size of the ribs when partially cured and as illustrated in Fig. 1. It will be observed that each rib retains a radial elongation of approximately 20%.

Experiments show that the abrasion resistance perpendicular to the elongation of conventional tread stock is increased about from 1% to 2% for each percent of elongation.

*Example*

A tire having a tread of conventional rubber stock was made in the form shown in Fig. 1 and pre-cured in a mold, not shown, at 30 pounds steam pressure for 50 minutes, resulting in a T-50 value of —2.3° C. It was then placed in the mold shown in Fig. 1, forced accurately into the rib cavities, and given a final cure, until the T-50 test was —19.0° C. In the finished tire the ribs were found to be permanently compressed 19% axially, and the ribs showed an abrasion rating of 116% (measured by the United States Rubber Company abrasion testing machine) as compared with non-compressed ribs. This is an improvement in abrasion resistance of 16%.

The elongation in the ribs shown in Fig. 1 was obtained by uni-directional compression of the ribs in an axial direction. In cases of tires in which the tread is sub-divided into small blocks rather than into circumferentially continuous blocks (sometimes described as ribs) it may be desirable to effect the radial elongation of the individual anti-skid blocks by compressing them in mutually perpendicular directions, that is, both axially and circumferentially of the tire, in which case a mold having corresponding individual block cavities is used. In such molds the cavities which deform the blocks are both narrower axially than the blocks, as illustrated in Fig. 1, and the cavities are also shorter circumferentially than the preformed blocks. Thus, when the blocks are forced into the molds corresponding to the manner shown in Fig. 1 they are compressed in directions both circumferentially and axially of the tire. This in effect compresses them in all directions parallel to the planes of their tread surfaces and produces more nearly uniform radial elongation throughout the area of each individual block.

If desired the tread may be fully cured before being compressed into the second mold shown in Fig. 1. In such case, the fully vulcanized tire may be subjected to a temperature of approximately 212° F. or higher for a period of from two to five hours while held in the second mold. While in such cases it has been found that the abrasion resistance of the tread is appreciably improved, we prefer to vulcanize the tread only partially before the final molding because such partial vulcanizing gives satisfactory improvement in abrasion resistance of the tread and the tire is more easily forced into the second mold, gives a more faithfully molded tread, and the grain or anisotropy may be established in a shorter heating period. Likewise, when the tread is partially cured rather than completely cured before being placed in the final mold, the percentage of retained elongation of the ribs is greater than when the tread is completely cured and then deformed and heated. This is of advantage because, as has been stated, the improvement in abrasion resistance appears to be a linear function of the elongation retained.

We have found that it is immaterial how the elongation of the rubber is produced while being heated, to establish the fiber. For example, the rubber may be stretched by uni-directional forces and held stretched while either the vulcanization is completed or while the rubber is heated, to induce fibering as described above. However, in the case of tires, we prefer to produce the elongation by uni-directional or multi-directional compression parallel to the abrasion resistant surface as this offers a convenient and economical method adaptable to mass production by means of conventional equipment.

The presence of fiber orientation can readily be determined by any of the suitable tests known to those skilled in the art. For example, molecular alignment can be detected by X-ray diffraction tests or by swelling and tearing the rubber. In the former test, the evidence of partial molecular alignment is the fact that the elongation at which a crystalline fiber diagram first appears is lower for the anisotropic rubber, when stretched in the direction of the permanent elongation, than for isotropic rubber. In the latter test the rubber is softened by a solvent, such as xylene, until it can readily be torn. The rubber tears along definite lines or planes which follow the aligned fibers and thus indicate their orientation. When isotropic rubber is subjected to this test, no definite planes of cleavage or tearing occur. In the case of small deformations and relatively slight fiber alignment, the swelling-and-tear method of testing is more sensitive than the X-ray diffraction tests.

It will be appreciated that the terms "rubber" and "rubber composition" as used in the claims include not only natural rubber compositions but reclaimed rubber and synthetic compositions which have an elastic behavior (including elasticity and cold flow properties) similar to rubber, as exemplified herein.

Having thus described our invention, what we claim and desire to protect by Letters Patent is:

1. The method of making an inflatable tire having an abrasion-resistant anti-skid tread which consists in forming a tire having a tread of rubber composition, the rubber being interrupted to subdivide the tread into a plurality of independent anti-skid elements, at least partially vulcanizing the tread, thereafter forcing the tread into a mold having cavities similar in shape and arrangement to the anti-skid elements of the tire but of smaller cross sectional area than the areas of the corresponding anti-skid elements, whereby the rubber of the elements is compressed substantially parallel to the tread surface and extended substantially normal to the tread surface, and heating the tread while so extended in the mold for a time and at a temperature sufficient to produce a permanent extension of the rubber in a direction substantially normal to the tread surface.

2. The method of making an inflatable tire having an abrasion-resistant anti-skid tread which consists in forming a tire having a tread of rubber composition molded to form a plurality of anti-skid elements, at least partially vulcanizing the tread, forcing the tire into a mold having cavities which are narrower and deeper than the anti-skid elements initially formed in the tread, whereby the rubber of the anti-skid elements is compressed substantially parallel to the wear surfaces thereof, and is elongated substantially normal to said surfaces so that the anti-skid elements are made narrower and higher than in their original shapes, and heating the tread while so held in the mold for a time and at a temperature sufficient to produce a permanent extension of the rubber substantially normal to the tread surface of the tire.

MELVIN MOONEY.
EUGENE M. GRABBE.
GLENN G. HAVENS.